United States Patent
Ummadi et al.

(10) Patent No.: US 10,477,880 B2
(45) Date of Patent: Nov. 19, 2019

(54) FROZEN CONFECTIONERY PRODUCTS

(71) Applicant: NESTEC S.A., Vevey (CH)

(72) Inventors: Madhavi Ummadi, Bakersfield, CA (US); Madansinh Nathusinh Vaghela, Bakersfield, CA (US); Aaron Beth Butterworth, Bakersfield, CA (US); Nirav Chandrakant Pandya, Bakersfield, CA (US); Bridgett Lynn McCune, Bakersfield, CA (US); Cristophe Joseph Etienne Schmitt, Servion (CH); Joumana Saikali, Paris (FR)

(73) Assignee: Societe des Produits Nestle S.A., Vevey (CH)

(*) Notice: Subject to any disclaimer, the term of this patent is extended or adjusted under 35 U.S.C. 154(b) by 329 days.

(21) Appl. No.: 14/989,063

(22) Filed: Jan. 6, 2016

(65) Prior Publication Data

US 2016/0135479 A1 May 19, 2016

Related U.S. Application Data

(62) Division of application No. 13/813,603, filed as application No. PCT/EP2011/062623 on Jul. 22, 2011, now Pat. No. 9,253,993.

(30) Foreign Application Priority Data

Aug. 5, 2010 (EP) .................... 10171988

(51) Int. Cl.
*A23G 9/40* (2006.01)
*A23G 9/38* (2006.01)

(52) U.S. Cl.
CPC ............. *A23G 9/40* (2013.01); *A23G 9/38* (2013.01); *A23V 2002/00* (2013.01)

(58) Field of Classification Search
CPC ............ A23G 9/40; A23G 9/00; A23G 9/38
USPC ................... 426/474, 522, 565, 520
See application file for complete search history.

(56) References Cited

U.S. PATENT DOCUMENTS

| 4,213,896 A | 7/1980 | Davis |
| 5,232,731 A | 8/1993 | Cain et al. |
| 5,308,628 A | 5/1994 | Schol et al. |
| 5,350,590 A | 9/1994 | McCarthy et al. |
| 5,413,804 A * | 5/1995 | Rhodes ............... A23C 19/063 426/583 |
| 6,514,555 B1 * | 2/2003 | Fayard ................. A23G 9/20 426/516 |
| 2007/0231453 A1 | 10/2007 | Bovetto et al. |
| 2008/0286432 A1 | 11/2008 | Bialek et al. |

FOREIGN PATENT DOCUMENTS

| DE | 19610672 | 9/1997 |
| EP | 0308091 | 3/1989 |
| EP | 0696426 | 2/1996 |
| EP | 1342418 | 9/2003 |
| EP | 1839495 | 10/2007 |
| EP | 412590 | 4/2009 |
| GB | 195224 | 3/1923 |
| WO | 89/05587 | 6/1989 |
| WO | 97/46111 | 11/1997 |
| WO | 2007110182 | 10/2007 |
| WO | 2010092091 | 8/2010 |

OTHER PUBLICATIONS

Marshall et al., Ice Cream, Fifth Edition 2000, Aspen Publication, pp. 48-49.*
Dr. Weil.com, What does Fat-free really mean? https://www.drweil.com/diet-nutrition/nutrition/what-does-fat-free-really-mean/ Feb. 22, 2010. (Year: 2010).*
Marshall et al., Ice Cream, Fifth Edition, 2000, Aspen Publication, pp. 20-29. (Year: 2000).*
Marshall et al., Ice Cream, Fifth Edition, 2000, Aspen Publication, pp. 10-15. (Year: 2000).*
Marshall et al "Ice Cream" 2000, Aspen Publications, Fifth edition, pp. 22-29.
International Search Report and Written Opinion dated Jan. 23, 2012 for corresponding Intl. Appln. PCT/EP2011/062623.

* cited by examiner

*Primary Examiner* — Jyoti Chawla
(74) *Attorney, Agent, or Firm* — K&L Gates LLP

(57) ABSTRACT

A method for producing frozen confectionery products comprising a coagulated protein system contributes to the improvement of textural and sensorial attributes of the confections, in particular of products based on lower fat formulations. Such a protein system is used in frozen confection prepared by conventional freezing alone or combined with low temperature freezing wherein it improves the microstructure and stability on frozen products.

20 Claims, No Drawings

FROZEN CONFECTIONERY PRODUCTS

PRIORITY CLAIM

The present application is a divisional of U.S. patent application Ser. No. 13/813,603 filed on Jan. 31, 2013, which is a National Stage of International Application No. PCT/EP11/062623 filed on Jul. 22, 2011, which claims priority to European Application No. 10171988.8 filed on Aug. 5, 2010, the entire contents of each incorporated herein by reference.

FIELD OF THE INVENTION

The present invention relates to a method for producing frozen confectionery products. In particular, the invention is concerned a method for producing frozen confections comprising a coagulated protein system which contributes to the improvement of textural and sensorial attributes of the confections, in particular of products based on lower fat formulations. Such a protein system is used according to the invention in frozen confection prepared by conventional freezing alone or combined with low temperature freezing wherein it improves the microstructure and stability on frozen products. Products obtained by said method also form part of the invention.

BACKGROUND OF THE INVENTION

Many technical routes have been explored in the prior art to improve the sensorial properties of low fat formulations used for the preparation of ice confections.

Low-temperature extrusion or low-temperature freezing is a technology that has been recently developed and which has been used to confer enhanced organoleptic properties to frozen confectionery products. Examples of such frozen confectioneries include ice cream, frozen yogurt, sorbet etc.

Such a method is described for instance in a general way in the following published documents: WO 2005/070225, WO 2006/099987, EP 0713650, U.S. Pat. No. 7,261,913 and more recently US 2007-0196553.

The products obtained by low-temperature extrusion have a particular microstructure as extensively described in Ph.D. Dissertation of Wildmoser J. submitted to the Swiss Federal Institute of Technology of Zurich in 2004, "Impact of Low Temperature Extrusion Processing on Disperse Microstructure in Ice Cream Systems".

Low temperature extrusion is used in the manufacturing of reduced and low fat frozen confectioneries wherein this technology is helping to compensate for the effect of a low fat content on the texture and mouthfeel of the product.

The prior art also discloses ways to improve the texture of low fat ice confection products prepared by conventional freezing through the use of specific emulsifiers. However, these additives are often perceived negatively by the consumer and solutions that get rid of such ingredients are highly sought.

Besides, consumers' demand continuously increases for "better for you" types of products with lower fat contents or even non fat products, while not compromising on taste. There is therefore a need to improve the results obtained here thereto and to improve the sensory profile of existing products.

SUMMARY OF THE INVENTION

The present invention now solves the foregoing problems by providing a method for providing a stable frozen confectionery product having enhanced or improved organoleptic properties.

In a first aspect, the invention relates to a method of producing a frozen confectionery product wherein controlled heat and acidic conditions are firstly applied to a composition comprising at least 7 wt % of dairy protein. According to a particular embodiment, said composition essentially consists of a mixture of whey protein, skim milk and water.

The coagulated protein system is then mixed with further ingredients to form a confectionery mix which is pasteurized and then frozen, either by conventional freezing or by further low temperature extrusion, to produce the frozen confectionery product.

More particularly, a method of producing a frozen confectionery product, comprising the steps of:

a) subjecting a composition comprising at least 7 wt % of dairy protein with a pH comprised between 5.6 and 6.5, to a heat treatment at a temperature between 80° and 140° C. for a time period of 5 seconds to 30 minutes to at least partially form a coagulated protein system including casein and whey protein;

b) optionally homogenising said composition before or after the heat treatment;

c) mixing said composition with further ingredients to form an ice confectionery mix;

d) pasteurizing the confectionery mix;

e) freezing while optionally aerating the confectionery mix, preferably to an overrun of at least 20%, preferably at least 40%, most preferably between 100% and 120% to form the frozen confectionery product;

f) optionally subjecting the confectionery product to a dynamic cooling at a temperature below −11° C.;

g) optionally hardening the confectionery product is part of the present invention.

The frozen confectionery products obtainable by this method also form an embodiment of the present invention.

The products obtainable by the invention present excellent organoleptic properties, in particular in terms of texture and mouthfeel even when very low levels of fat are used.

Besides, the products show good stability and can therefore advantageously allow avoiding the use of non-natural additives.

In the products of the invention, the coagulated protein system includes milk proteins, caseins, whey proteins or mixtures thereof that have been coagulated by a heat treatment in a mild acidic environment e.g. through the presence of molasses or of an organic acid. More particularly, the coagulated protein system of the products of the invention includes casein and whey protein including beta-lactoglobulin in the form of complexes or aggregates. The coagulated protein system is generally present in an amount sufficient to provide a smooth and creamy texture to the confectionery product without the use of non-natural stabilizers or other conventional artificial additives used for this purpose. Typically, the coagulated protein system is present in the frozen confectionery product in an amount of 0.5 to 4 wt %.

DETAILED DESCRIPTION OF THE INVENTION

In the following description, the % values are in wt % unless otherwise specified.

When reference is made to the pH, values correspond to pH measured at 25° C. with standard equipment.

The invention pertains to an optimized process of preparation of frozen confectioneries including the controlled use of heat in acidic conditions applied to a mix comprising at least 7 wt % proteins, further used as an ingredient in a frozen confectionery mix to be processed.

Preferably, the treated mix comprising at least 7 wt % dairy proteins does not undergo any drying, rehydration or concentration step before being mixed with the other ingredients to form an ice confectionery mix.

By "frozen confectionery product" is meant any frozen product such as ice cream, sorbet, mellorine or any frozen dessert etc. The product may be aerated.

A method for producing frozen confectionery products forms part of the invention, and more particularly a method of producing a frozen confectionery product comprising firstly producing a coagulated protein system and combining said system with a confectionery mix which is further optionally homogenised and pasteurised, and conventionally frozen or subjected to low temperature extrusion.

According to a particular embodiment, the method comprises as a first step providing a composition comprising at least 7% of dairy protein. The composition is preferably an aqueous composition comprising dairy protein in an amount such that the amount of dairy protein in the final product is less than 7%, preferably between 2% and 4% dairy protein.

Sources of dairy protein typically include liquid fresh milk, milk powder, standardised milk powder, skimmed milk powder, acid casein, sodium caseinate, acid whey, whey protein concentrate, whey protein isolate, sweet whey, demineralised sweet whey, demineralised whey or any mixtures thereof.

The composition is heat treated to at least partially form a coagulated protein system including casein and whey protein.

The term "coagulated protein system" is to be understood to mean a complex or an aggregate resulting from at least a partial coagulation of proteins present in a composition comprising dairy protein.

The heat treatment is carried out at a temperature of between 80 and 140° C. for a time period of 5 seconds to 30 minutes. Alternatively the heat treatment can be performed at lower temperatures such as between 60° and 80° C. with a longer hold time.

The composition heated has a pH value between 5.6 and 6.5, more preferably between 5.8 and 6.3.

Unless otherwise specified, reference to the pH in the context of the invention corresponds to the pH measured at room temperature before heat treatment.

In a particular embodiment, the composition comprising at least 7% dairy protein has a pH of 5.6 to 6.5, preferably 5.8 to 6.3, and is subjected to a heat treatment at a temperature between 80 and 90° C. for a time period of 5 seconds to 30 minutes.

In said embodiment, the pH of the composition comprising a source of dairy protein is thus reduced to a value of 5.6-6.5, preferably 5.8-6.3. This is typically achieved by including an acidic component such as those selected from liquid molasses, organic acids, such as citric acid, ethylenediaminetetraacetic acid (EDTA), fruit derived acids.

Alternatively, the composition comprising a source of dairy protein may be heated to a temperature above 90° C. up to 140° C., preferably 95-135° C., more preferably 100-130° C., for a time period of 5 seconds to 30 minutes. The composition has a pH comprised between 5.6 and 6.5 before being heat-treated.

Preferably, the composition comprising a source of dairy protein is not fermented.

Typically, at least 30%, preferably at least 45%, more preferably at least 60% of dairy protein is converted to said coagulated protein system.

Once the coagulated protein system has been produced, the composition may be homogenised. Typically, homogenisation is carried out at a pressure of between 40 and 200 bars, preferably between 100 and 150 bars, more preferably between 120 and 140 bars. In an embodiment, homogenisation may be carried out prior to the heat treatment.

The composition which, after heat treatment, comprises the coagulated protein system is then mixed with further ingredients to form an ice confectionery mix. Typically, the further ingredients include any of fat, sweetening agents, milk solids non-fat, stabilisers, emulsifiers, flavours, colourings, proteins, water, acidifying components, alkalinising components, or any mixtures thereof.

The confectionery mix thus typically comprises fat, preferably in an amount of 0.5-20%, milk solids non-fat, preferably in an amount of 5-15%, sweetening agent, preferably in an amount of 5-30%.

By "sweetening agent" it is to be understood ingredients or mixture of ingredients which impart sweetness to the final product. These include natural sugars like cane sugar, beet sugar, molasses, other plant derived nutritive sweeteners, and non-nutritive high intensity sweeteners. Typically, the sweetening agents are selected from dextrose, sucrose, fructose, corn syrups, maltodextrins, erythritol, sorbitol, aspartame, sucralose, steviolglycosides or any mixtures thereof.

A stabiliser system, preferably a natural stabiliser system, may also be included in an amount up to 6%.

By "stabiliser system" is to be understood a mixture of ingredients which contributes to the stability of the frozen product with respect to ice crystal formation, heat shock resistance, overall texture properties etc. Thus, the stabiliser system may comprise any ingredients which are of structural importance to the frozen confectionery.

The stabiliser system used in the present invention is preferably essentially or completely free of any artificial or non-natural emulsifier or stabiliser.

The stabiliser system used in the present products preferably comprises at least one emulsifier, preferably at least one natural emulsifier.

Natural emulsifiers include for example egg yolk, buttermilk, raw or processed acacia gum, lecithin (soy, sunflower, safflower or other plant derived lecithin), natural plant extracts (e.g. Q-Naturale®), rice bran extract or mixtures thereof. The natural emulsifiers have the advantage of conferring to the finished product a smoother texture and stiffer body which reduce the whipping time. The presence of natural emulsifiers results in air cells that are smaller and more evenly distributed throughout the internal structure of the ice cream. Preferably, the natural emulsifier used in the present stabiliser system is egg yolk. Typically, the ice confectionery mix comprises 0.5 to 1.4% egg yolk solids.

According to a specific embodiment, the product of the invention essentially consists in natural ingredients.

Therefore, the ice confectionery mix does not include any artificial or non-natural emulsifier or stabiliser.

By "natural ingredients" what are meant are ingredients of natural origin. These include ingredients which come directly from the field, animals, etc. or which are the result of a physical or microbiological/enzymatic transformation process. These therefore do not include ingredients which are the result of a chemical modification process.

Examples of non-natural ingredients which are avoided in this particular embodiment of the invention include for example mono- and diglycerides of fatty acids, acid esters of mono- and diglycerides of fatty acids such as acetic, lactic, citric, tartaric, mono- and diacetyl tartaric acid esters of mono- and diglycerides of fatty acids, mixed acetic and tartaric acid esters of mono- and diglycerides of fatty acids, sucrose esters of fatty acids, polyglycerol esters of fatty acids, polyglycerol polyricinoleate, polyethylene sorbitan mono-oleate, polysorbate 80, chemically extracted lecithin.

Chemically modified starches which are used in the art as stabilisers are also preferably avoided. These include for example oxidised starch, monostarch phosphate, distarch phosphate, phosphated or acetylated distarch phosphate, acetylated starch, acetylated distarch afipate, hydroxy propyl starch, hydroxypropyl distarch phosphate, acetylated oxidised starch.

The products of the invention are preferably essentially free of the preceding synthetic esters and modified starches. "Essentially free" means that these materials are not intentionally added for their conventional property imparting abilities, e.g. stabilizing, although there could be unintended minor amounts present without detracting from the performance of the products. Generally and preferably, the products of the invention will not contain any non-natural materials.

The products may thus include a natural stabilizer system such as those described in application EP 08171666.4, the entire content of which is expressly incorporated herein by reference thereto.

According to another particular embodiment, the stabiliser system used in the products of the invention comprises at least one non-natural emulsifier. Any food grade emulsifier typically used in ice confection could be used. Suitable emulsifiers include sugar esters, emulsifying waxes such as beeswax, carnauba wax, candedilla wax, plant or fruit waxes and animal waxes, polyglycerol fatty acid esters, polyglycerol polyricinoleate (PGPR), polysorbates (polyoxyethylene sorbitan esters), monoglycerides, diglycerides, lecithin and mixtures thereof.

A hydro-colloid such as agar, gelatine, gum acacia, guar gum, locust bean gum, gum tragacanth, carrageenan, carboxymethylcellulose, sodium alginate or propylene glycol alginate or any mixture of hydrocolloids can also be present in the stabilizer system.

The product may additionally comprise flavourings or colourings. Such flavourings or colourings, when used, are preferably selected from natural ingredients. These are used in conventional amounts which can be optimized by routine testing for any particular product formulation.

Preferably, mixing of the composition comprising the coagulated protein system with further ingredients is carried out such that the resulting confectionery mix has a content of coagulated protein system of 0.5 to 4%.

The confectionery mix is then pasteurized under standard conditions, typically at 86° C. during 30 seconds before being cooled to around 2 to 8° C. by known means. The mix may further be aged for 4 to 72 h at around 2 to 6° C. with or without stirring. Optionally, the addition of flavourings, colourings, sauces, inclusions etc. may be carried out prior to the ageing step. If flavourings, colourings, sauces, inclusions etc. are added, these are preferably selected from natural ingredients only.

In the next step, the mix may be aerated. In a preferred embodiment, the mix may be cooled to a temperature below −3° C., preferably between −3° and −10° C., preferably at about −4.5° to −8° C. with stirring and injection of gas to create the desired overrun.

The frozen confectionery is preferably aerated to an overrun of at least 20%, preferably at least 40%, more preferably at least 90%. The overrun is preferably up to 150%. Most preferably, the overrun is comprised between 100-120%.

The mix is then subjected to freezing either by using conventional freezing equipment or by a low temperature extrusion system. Thus, the confectionery mix may be optionally subjected to a dynamic cooling at a temperature below −11° C. In this equipment, the aerated mix is cooled by extrusion at a temperature of below −11° C., preferably between −12° C. and −18° C. in a screw extruder. The screw extruder may be such as that described in WO 2005/070225.

The extrusion may be performed in a single or twin screw extruder.

According to the present method, the frozen confectionery products can be produced by conventional freezing or by low-temperature extrusion.

A low temperature extruded frozen confectionery comprising the coagulated protein system defined above is thus another object of the present invention. This step of low-temperature extrusion (LTE) or low-temperature freezing (LTF) may be carried out in a single or twin screw extruder. By low-temperature extrusion (or low-temperature freezing) is meant extrusion at a temperature of below −11° C., preferably between −12° C. and −18° C.

Low-temperature extrusion (LTE) is a known process which imparts to the final product a specific and advantageous microstructure. For instance, ice crystal size and air bubble size tend to be smaller than in traditional manufacturing processes. On the other hand, the size of fat globules does not change significantly when LTE process is used.

When low-temperature extruded or low-temperature frozen, the products of the invention surprisingly present improved characteristics in terms of their microstructure compared to known low temperature extruded products.

Products obtained by low temperature freezing (LTF) are described in US 2007/0196553, the content of which is here-included by reference. For instance, ice crystal size and air bubble size tend to be smaller than in traditional manufacturing processes. Ice crystals, air cells, fat globules and agglomerates thereof shall be in a specific diameter range in order to enhance positive sensory and stability characteristics. Typically at least 50% in number of ice crystals/ice crystal agglomerates preferably in a size range between 5 and 30 microns (or mean value below 8-10 microns) together with a low degree of ice crystal interconnectivity improve scoopability and creaminess. At least 50% in number of air cells preferably in the diameter range between 2-10 microns (or mean value below 8-10 microns) delays bubble coarsening by coalescence during melting in the mouth so strongly, that creaminess sensation is significantly enhanced. The volume-averaged size distribution of fat globules/fat globules agglomerates preferably exhibits a peak in the size range between 2-20 microns. This size distribution represents the relative volume of fat globules of each specified diameter and has a significant direct impact on improving creaminess sensation in the mouth and also contributes to increased air cell structure stability against coalescence thus supporting also indirectly the creaminess attribute. These size measurements can be carried out by methods known to the skilled person. For instance, ice crystal size and air bubble size can be measured using optical microscopy and fat particle size analysis can be carried out by laser light scattering.

The low-temperature extruded frozen aerated confectionery products of the invention have a smoother mouthfeel and particularly appealing textural and organoleptic properties, compared to low-temperature extruded products known to date.

In terms of microstructure, the products of the invention can be characterised by an average equivalent diameter ($D_{21}$) of fat globule or fat globule agglomerates below 10 microns. This value can be quantitatively analysed in fluorescence microscopy of resin sections of cryo-fixed (−20° C.) and resin cryo-infiltrated (−20° C.) ice creams at a magnification of ×1440. Therefore, compared to a standard LTF process, the combination of LTF with the inclusion of coagulated protein system according to the invention leads to an intermediate size of fat globules.

Therefore, it has been surprisingly found out that the presence of a coagulated protein system according to the invention in a low temperature extruded product tremendously improves the sensory profile of the product and in particular that it enhances considerably the smooth and creamy texture of frozen confectioneries that contain this system.

This effect is even more surprising given that it is known from the art that protein coagulation has a negative impact on the organoleptic characteristics of ice cream products. In this regard, EP 1 342 418 teaches a method for preparing a frozen ice cream containing an acid component but ensuring that at least one protein does not react with the acid. According to this teaching, the contact time between the acid and the protein should be kept to a minimum.

In contrast, the present invention is directed to a coagulated protein system produced by a heat treatment, optionally in acidic conditions, which has been shown to considerably improve the texture of frozen confections prepared either by conventional freezing or by low temperature freezing.

When conventional freezing is used, the partial coagulation obtained by controlled application of heat and optionally acidic conditions to the mix results in exceptional sensory attributes which are comparable to those obtained by low temperature extrusion without such partial coagulation.

On the other hand, when low temperature extrusion is used, the inclusion of a coagulated protein system during mix processing and low temperature extrusion technology, allows the creation of very high quality frozen confectionery with a minimum of fat and fewer ingredients. While the use of low temperature extrusion to manufacture low fat ice cream has been widely practiced, the invention now creates a significantly superior product and hence unique advantage for the consumer.

Furthermore, the product of the invention has proven to be particularly stable, both when frozen as well as when dispensed at room temperature for consumption.

Without being bound by theory, it is believed that a coagulated protein system within the frozen confectionery mix is providing freshly coagulated protein that act as a natural stabilizer for the air cells and enable creation of a very fine and stable microstructure resulting in a smooth, rich and creamy product without the use of artificial or non-natural stabilizers or similar additives. This makes the products more natural and desirable for consumers who wish to minimize their intake of such artificial or non-natural additives.

In particular, the synergistic effect of the freshly coagulated proteins in the amounts used when combined with the LTF technology is therefore leading to superior products in terms of texture and stability.

Optionally, the confectionery mix is then hardened. The frozen mix is thus preferably packaged and stored at temperatures below −20° C., where it will undergo hardening step during storage. Alternatively, it can be hardened by accelerated hardening step, for example via a hardening tunnel, carried out at a temperature between −20° C. to −40° C. for a sufficient time to harden the product.

The process of the invention has surprisingly proven to enhance the textural experience of frozen dairy systems even at lower fat and calorie levels. The applicant has discovered that combination of a pre-mix comprising a coagulated protein system with confectionery product ingredients results in a product with smooth, creamy texture and superior flavour release when compared to typical low temperature extruded products. Without being bound by theory, it is believed that during the process, protein structure changes as heat unfolds whey proteins and destabilizes casein micelles. The modified protein forms a controlled network that binds water and fat globules while increasing mix viscosity to create a uniquely smooth and creamy texture that mimics the sensory attributes of higher fat products.

The frozen aerated confectionery products obtainable by the present method also form part of the invention.

The products obtainable by the present method preferably comprise 0.5 to 4% of coagulated protein system.

The term "coagulated protein system" is to be understood to mean a complex or an aggregate resulting from at least a partial coagulation of proteins present in a composition comprising dairy protein, for instance induced by a heat treatment, preferably in the presence of an acid component.

The process of the invention impacts the obtained product in such a way that compared to a process were no such specific heat and acidic conditions are used, one observes an increase in the volume of particles between 1 and 10

In the present disclosure, the terms "particle size" are meant to designate $D_{[3,2]}$. $D_{[3,2]}$ is the equivalent surface area mean diameter or the Sauter mean diameter of the particles of the coagulated protein system aggregated with fat as measured by laser diffraction on e.g. a Mastersizer Micro Particle Size Analyzer, from Malvern Instruments Ltd (UK). These particle sizes can be measured in the mix as well as in the end product. For measurements, samples are dispersed in water and measured according to the instructions of the instrument manufacturer. Frozen samples are allowed to melt before measuring. When the process of the invention is applied one observes an increase of $D_{[3,2]}$ of up to 60% depending on the used formulation.

The particle size distribution of a formulation (ice cream mix) that does not contain coagulated proteins is different from the same formulation that is treated according to the process of the invention which causes partial coagulation of the proteins in the formulation.

In particular when the process of the invention is applied, the volume of particles below 1 micron i.e. the fraction of particles expressed in % of volume that are below 1 micron is reduced up to 60% and the volume of particles between 1 and 10 microns is increased up to 140%.

Thus, the present coagulation treatment creates a three dimensional network that has the ability to have increased water binding capacity and results in an improvement of sensory attributes relating to texture and flavour.

Such a system offers the unexpected advantage that it can confer to the frozen confectionery product exceptional sensory attributes with good stability while minimizing the fat content.

Preferably, the proteins at the origin of the coagulation are milk proteins which comprise caseins and whey proteins.

Products obtainable by the present method typically comprise 0.5-20% fat, 5-15% MSNF, 5-30%, preferably 15-25% of a sweetening agent. Preferably, the amount of fat is less than 15%, more preferably from 0.5 to 12% and even more preferably 0.5-5.5%. They may also comprise a natural stabilizer in an amount of 0 to 6%. The amount of protein in such products is preferably less than 7%, preferably 2-4%.

The products may be aerated to an overrun of at least 20%, preferably at least 40% and more preferably at least 90%. In a most preferred embodiment, the overrun is 100-120%.

Preferably, the product is not fermented.

The product obtainable by the present method may be further characterised by a non-sedimentable protein content below or equal to 60%, preferably below 50%.

What is meant by "non-sedimentable protein", or non soluble protein, "non-sedimentable casein" or yet "non-sedimentable whey protein" is the amount of corresponding protein in the soluble fraction of the ice confection once melted at room temperature (25° C.) and centrifuged at 50,000 g for 30 min using for example a Sorvall RC-5 plus centrifuge equipped with a SM 24 rotor or an equivalent device enabling to apply similar acceleration during the same time.

The content of non-sedimentable or "soluble" protein in the confectionery product is inversely proportional to the amount of coagulated protein system in said product. Thus, an important amount of coagulated protein system in the confectionery product will reduce the amount of non-sedimentable protein in said confectionery product.

The coagulated protein system is obtainable by subjecting a composition comprising at least 7 wt % of dairy proteins to a heat treatment at a temperature of between 80 and 90° C. at a pH between 5.6 and 6.5, preferably between 5.8 and 6.3. Alternatively, the coagulated protein system is obtainable by subjecting a composition comprising dairy proteins to a heat treatment at a temperature above 90° C. up to 140° C., preferably 95-135° C., more preferably 100-130° C., preferably at a pH comprised between 5.6 and 6.5.

The time period for the heat treatment is typically 5 seconds to 30 minutes.

Acidic conditions are required to form the coagulated protein system. Any acidic component such as those selected from liquid molasses, organic acids, such as citric acid, ethylenediaminetetraacetic acid (EDTA) or fruit derived acids.

Most milk proteins (mainly caseins) in their native state remain in colloidal suspension form leading to minimal changes to mix viscosity (~200-400 cp). However, when proteins are subjected to controlled exposure to known amounts of heat and acid (e.g. pH of 6.1 or less), they undergo coagulation. Coagulation is a state where the proteins are hydrated resulting in a three dimensional network (soft gel) causing increased mix viscosity (~1800-2400 cp). If the exposure of proteins to heat and optionally acid is not controlled, this phenomenon could lead to precipitation (e.g. syneresis in yogurt). In the worst case scenario, the liquid separates from the precipitate and the size of the solids decreases.

The applicant has discovered that texture and mouthfeel of ice confections is improved as a result of an optimized process of preparation including the controlled use of heat and optionally acidic conditions. More particularly, by manipulating the milk protein structure in a composition to be added to an ice confection mix by exposing the dairy protein to controlled heat and decreasing the pH, it is believed that protein denaturation and subsequent aggregation occurs as heat unfolds whey protein and destabilizes casein micelles. These protein aggregates form a network that is suspected of entrapping water and fat globules and increases mix viscosity to create a uniquely smooth, creamy texture that mimics the presence of higher fat levels.

It can therefore be concluded that the process described in the present invention is leading to the formation of covalent complexes (probably linked by disulphide bonds) between casein and whey protein and that these complexes are more numerous in the control sample (higher initial casein band density). Without being bound by theory, it is believed that casein micelles are coated with whey protein including beta-lactoglobulin under the heat and acidic conditions of the present invention and are either entrapped in the fat phase or in the insoluble phase after centrifugation, leading to a depletion of the protein aggregates in the soluble phase. The non-sedimentable aggregates are mainly composed of whey protein and casein complexes that did not adsorb with the casein micelles to the fat droplet interface during ice cream manufacture or were not sensitive to centrifugation, but remained in the bulk phase. The coagulated protein system of the invention therefore consists on the one hand in casein micelles/whey protein complexes which can be defined as covalent protein aggregates formed between the kappa-casein from the surface of the casein micelles. On the other hand, the coagulated protein system consists mostly in non-sedimentable casein/beta-lactoglobulin complexes present in the frozen confection bulk.

The amount of casein and whey protein as beta-lactoglobulin can be measured from Coomassie Blue gel electrophoresis analysis. The content of these two proteins can be determined from analysis of the intensity of the corresponding migration bands on reduced electrophoresis Nu-PAGE gels.

Method:

For total sample, an aliquot of 10 g of melted ice cream was dispersed in 90 g of a deflocculating aqueous solution at pH 9.5 containing 0.4% EDTA and 0.1% Tween 20. The soluble phase was obtained by centrifugation of the melted ice cream at 50,000 g for 30 min. Samples were then analyzed by gel electrophoresis on Nu-PAGE 12% Bis-Tris using the MOPS running buffer in reducing and non-reducing conditions (reducing conditions should break any covalent bound involving SH/SS exchange during heating) as described in "Invitrogen Nu-PAGE pre-cast gels instructions" (5791 Van Allen Way, Carlsbad, Calif. 2008, USA). Gels were stained with Coomassie blue (Invitrogen kit no. LC6025). The total sample and the corresponding soluble phase were deposited on the same electrophoresis gel at a concentration of 0.5 mg·mL$^{-1}$. After migration and staining with colloidal blue, the gels were scanned in 256 gray levels with a resolution of 1000 dpi using a UMAX scanner coupled with the MagicScan 32 V4.6 software (UMAX Data Systems, Inc.) leading to pictures having a size of 16 MB. These pictures were then analyzed using the TotalLab TL120 v2008.01 image analysis software (Nonlinear Dynamics Ltd, Cuthbert House, All Saints, Newcastle upon Tyne, NE1 2ET, UK). Migration lanes were detected automatically by the software. Then, image was corrected for background using the "rolling ball" option with a radius of 200. Protein bands corresponding to bovine serum albumin (BSA), β-casein, αs1- and as2-casein, casein, β-lactoglobulin (β-lg) and α-lactalbumin (α-1a) were detected manually using the migration bands from a skimmed milk as a standard. The intensity of the bands was converted into peak migration profiles for each migration lane for the total sample and the soluble phase. These peaks were then fitted with a Gaussian model in order to calculate their area for each protein, and thereby the concentration of the protein in the sample.

The peak area determined for a protein in the soluble phase was thereafter corrected by the effective protein content determined by the Kjeldahl method (described thereafter) and normalised by the peak area of the corresponding protein in the total sample.

The amount of proteins present in the soluble phase after centrifugation can also be measured by Kjeldahl method using a conversion factor of 6.38 for milk proteins.

Kjeldahl Method:

Kjeldahl is a general method allowing the determination of total nitrogen, using a block-digestion apparatus and automated steam distillation unit.

This method is applicable to a wide range of products, including dairy products, cereals, confectionary, meat products, pet food, as well as ingredients containing low levels of protein, such as starches. Nitrogen from nitrates and nitrites is not determined with this method. This method corresponds to the following official methods: ISO 8968-1/IDF 20-1 (milk), AOAC 991.20 (milk), AOAC 979.09 (grains), AOAC 981.10 (meat), AOAC 976.05 (animal feed and pet food), with small modifications (adaptation of catalyst quantity and sulphuric acid volume for digestion, and adaptation of boric acid concentration for automated system).

Principle of the method: Rapid mineralisation of the sample at about 370° C. with sulfuric acid and Missouri catalyst, a mixture of copper, sodium and/or potassium sulfate, which transforms organically bound nitrogen to ammonium sulfate. Release of ammonia by addition of sodium hydroxide. Steam distillation and collection of the distillate in boric acid solution. Acidimetric titration of ammonium.

Apparatus: Mineralisation and distillation unit in combination with a titration unit.

Manual, semi-automated and automated conformations are possible.

These methods are known from a skilled person in the art of frozen confectionery who has a good knowledge of proteins.

The reduction of fat in frozen confectioneries without compromising the indulgent quality of the product is one of the main challenges faced by the industry. The present invention is overcoming this issue in providing low fat or even non-fat products with similar texture and sensory attributes than those having higher fat contents in terms of creaminess and flavour delivery.

Furthermore, the benefit of the system according to the invention extends to other parts of the cold-chain distribution of such products, in that products which have gone through typical heat shock or distribution abuse maintain the smooth, creamy texture longer than other products that are subjected to the same treatment.

Thus, the present invention proposes a new way in which a low fat, preferably natural frozen confectionery product which is stable and with superior sensory attributes may be manufactured.

EXAMPLE

Frozen Confection
Test:
Mix 1:

| Ingredients | Wt % in the composition |
|---|---|
| Water | 67.8 |
| Sweet whey powder | 16.9 |
| Skim milk powder | 14.7 |
| Lemon Juice concentrate | 0.6 |
| TOTAL | 100 |

Mix 1 has a pH of 6.0 at 25° C.
Mix 1 was processed under the following conditions:
Mixing
Pre-heating at 72° C.
homogenisation at 40 bar (total pressure)
Heat treatment at 86° C. for 30 seconds
cooling at 4° C.
A second mix 2 having the following formulation was prepared:
Mix 2:

| Ingredients | Wt % in the composition |
|---|---|
| Water | 49.2 |
| Sugar | 14.5 |
| Glucose syrup 60% | 21.3 |
| Stabilizers and emulsifiers | 0.6 |
| Dextrose | 2.1 |
| Skim milk powder | 1.4 |
| Coconut fat | 10.9 |
| TOTAL | 100 |

Mix 1 was then mixed with mix 2 to form an ice confectionery mix in the following proportions:

| Mix 2 | 70.5 wt % |
|---|---|
| Mix 1 | 29.5 wt % |

The ice confectionery mix was pasteurized at 86° C. for 30 seconds, cooled at 74° C. and then frozen at −6° C. with an overrun of 100%. The frozen product was then hardened at −40° C.

As a control, an ice confection mix consisting in mix 1 without lemon juice concentrate and mix 2 as defined above was prepared. Said mixture has a pH of 6.7 (no adjustment was made). The mixture was then pasteurized at 86° C. for 30 seconds, cooled at 74° C. and then frozen at −6° C. with an overrun of 100%. The frozen product was then hardened at −40° C.

A panel of experts tested the product prepared according to the process of the invention and the control and concluded that the texture of the product of the invention was significantly smoother than that of the control.

The invention is claimed as follows:

1. A frozen confectionery product obtained by a method comprising:
subjecting a composition having a pH between 5.8 and 6.5 and comprising at least 7 wt. % of dairy protein comprising a protein source selected from the group consisting of liquid fresh milk, milk powder, standardised milk powder, skimmed milk powder, acid casein, sodium caseinate, and combinations thereof to a heat treatment at a temperature between 120° C. and 140° C. for a time period of 5 seconds to 30 seconds to at least partially form protein aggregates comprising casein and whey protein, wherein at least 30 wt. % of the dairy protein in the composition is converted to the protein aggregates by the heat treatment of the composition;

mixing the heat treated composition with further ingredients to form an ice confectionery mix;

pasteurizing the ice confectionery mix; and freezing the pasteurized ice confectionery mix to form the frozen confectionery product, wherein the frozen confectionery product has an average equivalent diameter of fat globules below 10 microns, the protein aggregates comprising casein and whey protein are 0.5 wt. % to 4 wt. % of the frozen confectionery product, the casein protein is covalently bonded to the whey protein in the protein aggregates, and the frozen confectionery product has a smooth and creamy texture.

2. The frozen confectionery product of claim 1, wherein at least 45 wt. % of the dairy protein in the composition is converted to the protein aggregates by the heat treatment of the composition.

3. The frozen confectionery product of claim 1 having a non-sedimentable protein content below or equal to 60%.

4. The frozen confectionery product of claim 1 having a non-sedimentable protein content below or equal to 50%.

5. The frozen confectionery product of claim 1, wherein the composition subjected to the heat treatment consists essentially of a mixture of whey protein, skim milk powder and acidic component in water.

6. The frozen confectionery product of claim 1, wherein the composition that comprises at least 7 wt. % of dairy protein is not a fermented composition.

7. The frozen confectionery product of claim 1, wherein the further ingredients comprise an ingredient selected from the group consisting of fat, sweetening agents, milk solids non-fat, stabilisers, emulsifiers, flavours, colourings, proteins, water, acidifying components, alkalinising components, and mixtures thereof.

8. The frozen confectionery product of claim 1, wherein the ice confectionery mix comprises egg yolk solids in an amount of 0.5 to 1.4 wt. % of the mix.

9. The frozen confectionery product of claim 1, wherein the ice confectionery mix does not include any artificial or non-natural emulsifier or stabiliser.

10. The frozen confectionery product of claim 1, wherein the method further comprises homogenising the composition before the heat treatment.

11. The frozen confectionery product of claim 1, wherein the method comprises subjecting the frozen confectionery product to a dynamic cooling at a temperature below $-11°$ C.

12. The frozen confectionery product of claim 11, wherein the method further comprises hardening the dynamically cooled confectionery product.

13. The frozen confectionery product of claim 1, wherein the dairy protein in the composition subjected to the heat treatment comprises an additional protein source selected from the group consisting of acid whey, whey protein concentrate, whey protein isolate, sweet whey, demineralised sweet whey, demineralised whey, and combinations thereof.

14. The frozen confectionery product of claim 1, wherein the heat treated composition does not undergo any drying, rehydration or concentration before the mixing with the further ingredients.

15. The frozen confectionery product of claim 1, wherein the dairy protein is between 2 wt. % and 4 wt. % of the frozen confectionery product.

16. The frozen confectionery product of claim 1, wherein at least 60 wt. % of the dairy protein in the composition is converted to the protein aggregates by the heat treatment of the composition.

17. The frozen confectionery product of claim 1, wherein the ice confectionery mix comprises 0.5-20 wt. % of fat, 5-30 wt. % sweetening agent, and 5-15 wt. % milk solids non-fat.

18. The frozen confectionery product of claim 1, wherein the particle size of the composition is increased up to 60% by the heat treatment of the composition, the volume of particles in the composition that have a particle size below 1 micron is reduced up to 60% by the heat treatment of the composition, and the volume of particles in the composition that have a particle size between 1 and 10 microns is increased up to 140% by the heat treatment of the composition.

19. The frozen confectionery product of claim 1, wherein the product does not include any artificial or non-natural emulsifier or stabiliser and consists of natural ingredients.

20. The frozen confectionery product of claim 1, wherein the composition subjected to the heat treatment consists of a mixture of whey protein, skim milk powder and acidic component in water.

* * * * *